(12) United States Patent
Baumgart et al.

(10) Patent No.: US 7,214,916 B2
(45) Date of Patent: May 8, 2007

(54) OPTICAL ARRANGEMENT FOR A HOMING HEAD WITH MOVABLE OPTICAL ELEMENTS

(75) Inventors: Jörg Baumgart, Salem (DE); Dirk Krogmann, Uhldingen (DE); Hans Dieter Tholl, Uhldingen (DE)

(73) Assignee: Diehl BGT Defence GmbH & Co., KG, Überlingen (DE)

( * ) Notice: Subject to any disclaimer, the term of this patent is extended or adjusted under 35 U.S.C. 154(b) by 184 days.

(21) Appl. No.: 11/126,414

(22) Filed: May 11, 2005

(65) Prior Publication Data

US 2005/0258338 A1    Nov. 24, 2005

(30) Foreign Application Priority Data

May 19, 2004    (DE) .................. 10 2004 024 859

(51) Int. Cl.
*G01C 21/02* (2006.01)
(52) U.S. Cl. .................. 250/203.6; 250/208.1
(58) Field of Classification Search ............. 250/203.6, 250/208.1, 216, 201.2
See application file for complete search history.

(56) References Cited

U.S. PATENT DOCUMENTS 4,824,205 A    4/1989 Yamashita et al.
5,018,808 A    5/1991 Meyers et al.
5,528,354 A *  6/1996 Uwira ................. 356/5.01

FOREIGN PATENT DOCUMENTS

| GB | 2 093 213 A | 2/1982 |
| JP | 56-164325 | 12/1981 |
| JP | 61176907 A | 8/1986 |
| JP | 07035992 A | 7/1993 |
| JP | 2001042248 A | 2/2001 |
| WO | WO 00/11515 | 3/2000 |
| WO | WO 01/75388 A1 | 3/2000 |

* cited by examiner

*Primary Examiner*—Que T. Le
(74) *Attorney, Agent, or Firm*—Scully, Scott, Murphy & Presser, P.C.

(57) ABSTRACT

An optical arrangement (2) for a homing head (16), for the purpose of imaging an object scene onto a detector unit (4), including a control unit (24), a first optical unit (10) having two at least partially transparent optical elements, in particular prisms (42, 44), a second optical unit (14) and a beam deflecting unit (18), the first optical unit (10) directing radiation from at least two sections of the object scene onto the beam deflecting unit (18) in a superimposed fashion, and the beam deflecting unit (18) selecting one of the sections and, in conjunction with the second optical unit (14), imaging the selected section on the detector unit (4).

12 Claims, 3 Drawing Sheets

OPTICAL ARRANGEMENT FOR A HOMING HEAD WITH MOVABLE OPTICAL ELEMENTS

BACKGROUND OF THE INVENTION

1. Field of the Invention

The invention proceeds from an optical arrangement for a homing head, for the purpose of imaging an object scene onto a detector unit, comprising a control unit, a first optical unit having two at least partially transparent optical elements, in particular prisms, a second optical unit and a beam deflecting unit, the first optical unit being prepared for directing radiation from at least two sections of the object scene onto the beam deflecting unit in a superimposed fashion, and the beam deflecting unit being prepared for selecting one of the sections and, in conjunction with the second optical unit, for imaging the selected section on the detector unit.

2. Discussion of the Prior Art

A target-tracking optics of a homing head, for example a missile homing head or a surface-based homing head, serves the purpose of imaging an object scene from the surroundings of the homing head with a high image refresh frequency. The homing head is generally subjected in this case to shaking or vibrations which can render it difficult to evaluate the images recorded. In addition, interfering radiation emitted for defensive purposes can render evaluation difficult.

SUMMARY OF THE INVENTION

It is therefore the object of the invention to specify an optical arrangement for a homing head which comprises an optics supporting the evaluation of images.

This object is achieved by means of an optical arrangement of the type mentioned at the beginning and which according to the invention comprises a micromechanical movement actuator, the optical elements being mounted movably relative to one another, and the control unit being prepared for setting a spacing between the optical elements. The beam path through the optical elements can be corrected while an image sequence is being recorded owing to the fact that the spacing between the optical elements can be set. The images can be stabilized, in particular with regard to vibration or shaking, and it is possible to suppress undesired radiation at least partially. The micromechanical movement actuator permits a movement accuracy of below 1 μm, and can be a piezoelectric element. The optical elements can be prisms which have the shape of an arbitrary polyhedron.

The arrangement advantageously comprises at least three movement actuators which can be driven independently of one another, the control unit being prepared for controlling tilting of the optical elements relative to one another. A slight deflection of the beam path in a subpixel range can be achieved with very high accuracy by tilting the optical elements relative to one another. A tilting of the optical elements about a first axis and, independent of the above, about a second axis differing from the first one can be performed by three movement actuators which can be driven independently of one another. In addition, the optical elements can be stably mounted with three movement actuators.

The arrangement advantageously comprises a detector unit and a means for determining a position of the image on the detector unit, the control unit being prepared for controlling tilting of the optical elements as a function of stipulations from the means. A high line-of-sight stability can be achieved for images recorded one after another. The means can be an image processing unit which, for example, determines a prominent contour of a recorded image of the object scene and compares the position with the position of the contour in a subsequent image. In the event of an undesired deviation of the positions, for example owing to vibration or shaking, the optical elements can be tilted appropriately before a third image is recorded so that the beam path is corrected in such a way that the contour comes to lie in a desired position. It is also possible for the means to be an acceleration sensor. Acceleration can be detected and it is possible, for example, with the aid of a characteristic map, to determine a corrective tilting of the optical elements relative to one another and prompt the movement actuator to be driven appropriately.

The control unit and the means for determining a position of the image expediently form a control loop. An effective and rapid line-of-sight stabilization can be achieved. The control carried out by the control loop can be switched on and off manually, it also being possible to carry out the control as a function of a parameter, for example a vibration or a measure of shaking. The control can be of the closed loop type, in the case of which no further parameter influences the controlled variable or the line-of-sight stabilization. It is also possible to allow other parameters such as, for example, temperature and acceleration frequencies or acceleration values, to influence the control.

A stable and precise setting of the spacing of the optical elements relative to one another can be achieved if the optical elements are supported against one another via the movement actuator. The movement actuator can be arranged here between mutually facing surfaces of the optical elements and be connected to these surfaces indirectly or directly. Moreover, the optical elements can be firmly connected to one another via the movement actuator.

In a further refinement of the invention, the arrangement comprises at least two, in particular at least three, movement actuators which can be driven independently of one another. Accurate setting of a spacing between the prisms, and tilting, in particular biaxial tilting, of the prisms relative to one another is possible.

In particular, the control unit is prepared for setting a spacing as a function of a prescribed spectral region which experience at least 80 per cent extinction owing to multiple interference between the optical elements. Two surfaces of the optical elements can be used according to the principle of the Fabry-Perot spectrometer to at least largely extinguish a desired spectral region. A spectral region is also understood as a single substantially sharp frequency for example that of a laser. Interfering radiation from a defensive device which has, for example, been emitted by a laser source, can be at least largely extinguished in a targeted fashion between optical elements so as to facilitate an evaluation of the recorded images despite interfering radiation. Destruction of the detector, at least, is avoided. The spectral region can be preset or can be prescribed by the control unit, for example with the aid of a measurement result. It is also possible for a further unit to make the stipulation.

In order to achieve as good an extinction as possible according to the principle of a Fabry-Perot spectrometer, the optical elements respectively have a flat surface, it being possible for the two surfaces to be aligned parallel to one another and at a spacing from one another which can be set.

A further advantage of the invention is achieved when the control unit is prepared for controlling a sequence of tilt positions of the optical elements relative to one another in such a way that the object scene is imaged on the detector unit in multiple sequence—and in each case in a fashion offset from a basic image by less than one spacing between two adjacent pixels of the detector unit. A subpixel resolution can thereby be achieved with the aid of computational methods. The resolution can be raised to less than one pixel by summing up a number of images recorded in an offset fashion, and forming a centroid with the aid of image-processing methods. The summation can be built up such that a section of the image firstly comes to lie centrally on a pixel of the detector unit, and is deflected in subsequent images by a distance of in each case half the pixel pitch via the inactive zone between the pixels to the adjacent eight pixels, for example. The centroid of an object of the section can be calculated from the summed signal components.

In a further refinement of the invention, the arrangement comprises at least two pairs of optical elements each having one movement actuator, a first pair being provided for imaging a first section of the object scene, and a second pair being provided for imaging a second section, different from the first one, of the object scene on the detector unit. With the use of further optical elements, if appropriate, each pair therefore images a section of the object scene or a field of view on the detector unit, it being possible to compile the fields of view to form a total image. A large overall image of high resolution can be achieved.

The optical arrangement can be used in all target-tracking optics. A missile homing head having such an optical arrangement is particularly advantageous.

BRIEF DESCRIPTION OF THE DRAWINGS

Further advantages emerge from the following description of the drawing. Exemplary embodiments of the invention are illustrated in the drawing. The drawing, the description and the claims contain numerous features in combination. The person skilled in the art will also expediently consider the features individually and group them into further rational combinations.

In the drawing.

DETAILED DESCRIPTION OF THE INVENTION

Figure 1:
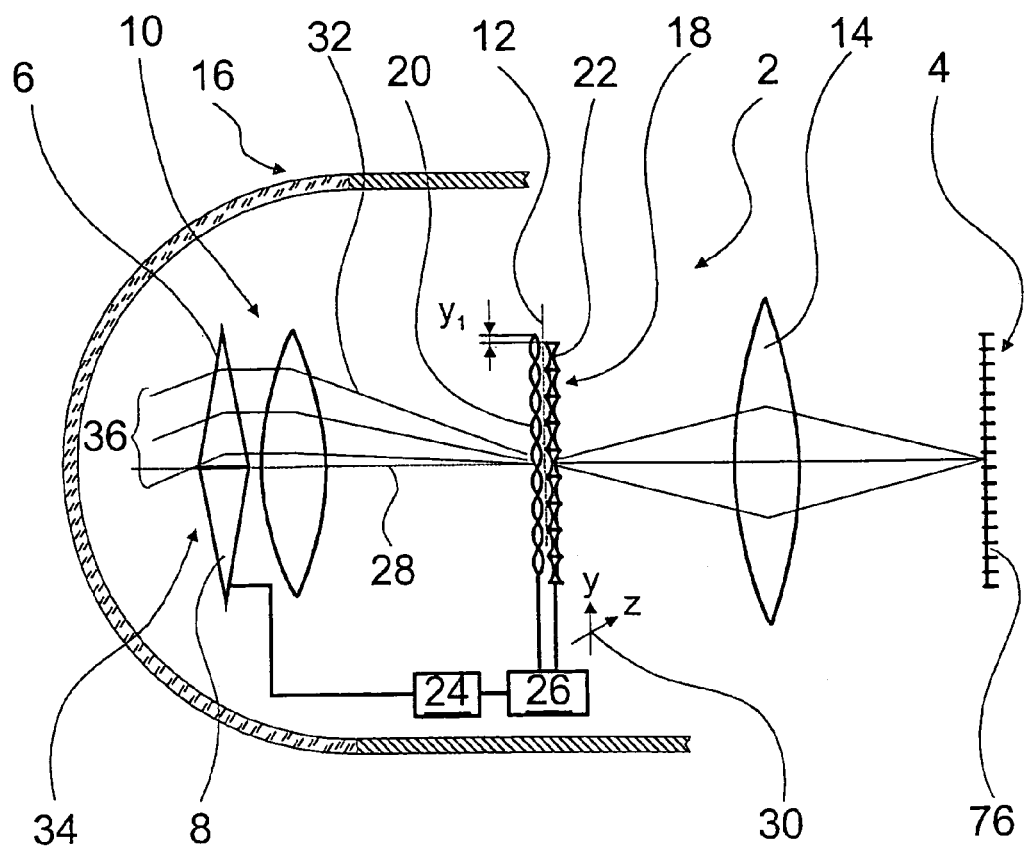
FIG. 1 shows an optical arrangement for imaging an object scene onto a detector unit in a homing head.

FIG. 1 shows an optical arrangement 2 for imaging an object scene onto a detector unit 4. The optical arrangement 2 comprises four prism pairs 6, 8, of which only two prism pairs 6, 8 are illustrated diagrammatically as triangles in FIG. 1. The four prism pairs 6, 8 are part of an optical unit 10 for directing radiation from four sections of the object scene in a superimposed fashion into an intermediate image plane 12 in which the four sections are imaged in a mutually overlapping fashion. Apart from the prism pairs 6, 8, the optical unit 10 is illustrated only diagrammatically as a lens. A second optical unit 14, likewise illustrated diagrammatically, serves the purpose of imaging the object scene on the detector unit 4. The optical arrangement 2 is arranged in a homing head 16 of a missile, whose casing is indicated.

A beam deflecting unit 18 having two microoptical lens fields 20, 22 is arranged in the intermediate image plane 12. The two lens fields 20, 22 comprise in each case, for example, 256×256 optical elements configured as lenses and which are constructed in the first micro-optical lens field 20 as positive lenses, and in the second micro-optical lens field 22 as diverging lenses. Both lens fields 20, 22 are square and flat. The dimensions of the individual lenses of the lens fields 20, 22 are a few to 10 µm, for example. In a way similar to the lens fields 20, 22, the detector unit 4 comprises, for example, 256×256 detector element 76, each detector elements 76 being assigned a lens pair composed of a positive lens of the lens field 20, and of a diverging lens of the lens field 22. A section of the object scene imaged on the lens pair in the intermediate image plane 12 can be imaged on the assigned detector element 76 by appropriately aligning the lenses with one another. The dimensions of the detector elements 76 correspond in each case to the microlenses of the lens fields 20, 22 in a fashion scaled with a linear magnification determined by the optical unit 14.

In order to move the lens fields 20, 22 relative to one another, the optical arrangement 2 has a control unit 24 which drives a movement unit 26. With the aid of the movement unit 26, the two lens fields 20, 22 are supported such that they can move in the two orthogonal spatial directions y, z perpendicular to the optical axis 28 of the optical arrangement 2 as illustrated by the arrows 30.

In the case of an aligned arrangement of the lenses of the lens fields 20, 22 in the direction of the optical axis 28, radiation 32 passes through the beam deflecting unit 18 substantially without change. In FIG. 1, the lens fields 20, 22 are not aligned, but arranged somewhat offset from one another. The lens field 20 is displaced by comparison with the lens field 22 by the distance $y_1$ in the y-direction. The radiation 32 is thus deflected somewhat in the y-direction as shown. In a similar way, upon a displacement of the lens field 20 in the negative y-direction relative to the optical lens field 22, the radiation 32 is deflected somewhat in the negative y-direction.

Figure 2:
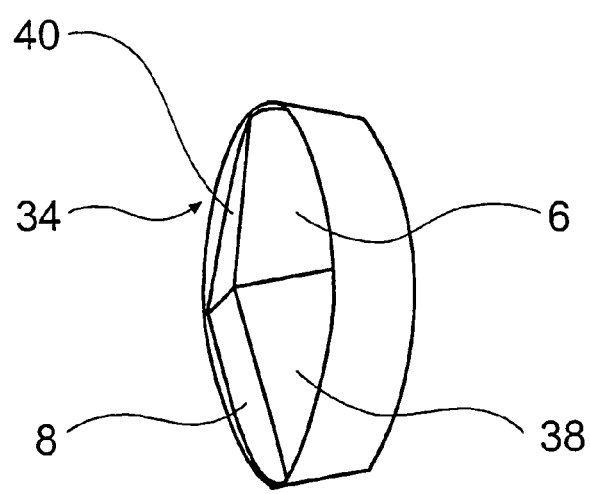
FIG. 2 shows a prism attachment of the optical arrangement.

FIG. 2 shows a prism attachment 34 in a perspective and diagrammatic illustration. The prism attachment 34 comprises the two prism pairs 6, 8 shown in FIG. 1, as well as two further prism pairs 38, 40. The four prism pairs 6, 8, 38, 40 in each case direct radiation 32 from a section, assigned to the prism pairs 6, 8, 38, 40, of the object scene to the beam deflecting unit 18 and further to the detector unit 4. An overall image of the object scene can be compiled from four resulting fields of view 36. The selection of the section, imaged on the detector unit 4, of the object scene is performed by selecting the position of the micro-optical lens fields 20, 22 relative to one another. One of the four sections is imaged on the detector unit 4 depending on the displacement of the micro-optical lens fields 20, 22 relative to one another.

Figure 3:
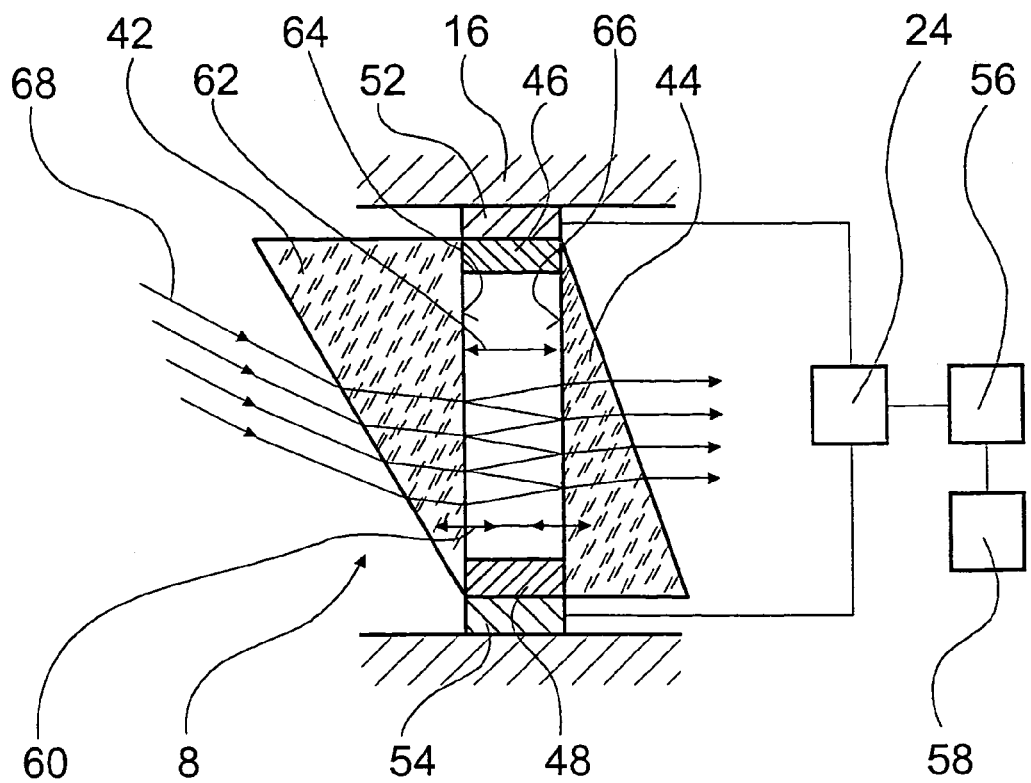
FIG. 3 shows a section through a prism pair of the prism attachment with movement actuators.
Figure 4:
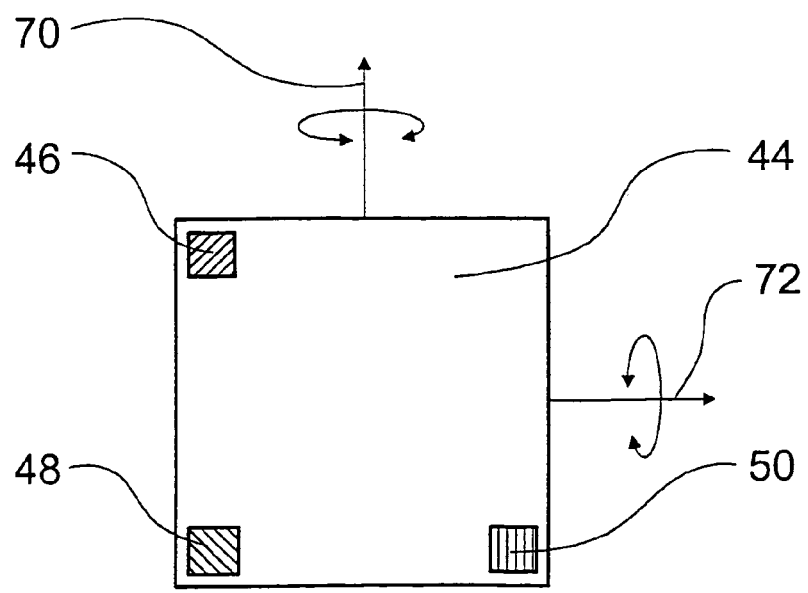
FIG. 4 shows a longitudinal section through the prism pair from FIG. 3.

Each of the prism pairs 6, 8, 38, 40 comprises two prisms 42, 44, which are shown in more detail in FIG. 3. The two prisms 42, 44 of the prism pair 8 are shown diagrammatically in a sectional illustration in FIG. 3. Arranged between the prisms 42, 44 are three piezoelectric movement actuators 46, 48, of which only two are shown. The third piezoelectric movement actuator 50 is shown in FIG. 4. The movement actuators 46, 48, 50 each comprise a piezoelectric crystal which is respectively held on a retaining means 52, 54 and is connected to the wall of the homing head 16 indirectly via the retaining means 52, 54. The retaining means 52, 54 serve, in addition, as voltage supply for the piezoelectric crystals and are each connected electrically to the control unit 24. The control unit 24 is connected, in turn, to a means 56 for determining a position of an image of the object scene on the detector unit 4 which, for its part, is in contact with an acceleration sensor 58. The means 56 comprises an image processing device.

The two prisms 42, 44 of the prism pair 8 are fastened to one another via the movement actuators 46, 48, 50 and thereby supported against one another. The prisms 42, 44 are mounted such that they can be moved relative to one another in the direction of the arrows 60 by the movement actuators 46, 48, 50, such that a spacing 62 can be freely selected between two mutually facing surfaces 64, 66 of the prisms 42, 44 within prescribed limits. In the event of incidence of coherent radiation 68 in the prism pair 8, the said radiation is multiply reflected to and fro between the surfaces 64, 66 of the prisms 42, 44. This implements the principle of a Fabry-Perot interferometer such that the radiation 68 is largely extinguished given a suitable selection of the spacing 62. The extinction results from multiple interference between the prisms 42, 44. Thus, a radiation 68 irradiated by an interfering laser, for example, can be extinguished by up to 90% such that it is possible to evaluate images of the object scene on the detector unit 4 despite irradiation of disturbing radiation 68.

The movement actuators 46, 48, 50 can be driven separately from one another by the control unit 24. It is possible thereby to tilt the prisms 42, 44 within a prescribed range about two tilt axes 70, 72 at right angles to one another, for example. A slight beam deflection of incident radiation 32 can be achieved very precisely by tilting the prisms 42, 44 relative to one another. A deflection of the radiation 32 inside the optical arrangement 2 by 1 mrad can be achieved by a tilt of 40 mrad of the prisms 42, 44 relative to one another, as a result of which a displacement of an image of an object scene on the detector unit by a pixel spacing 74 (FIG. 5) is achieved. The pixel spacing 74 corresponds in this case to the distance from the midpoint of a detector element 76 to the midpoint of an adjacent detector element 76.

Figure 5:
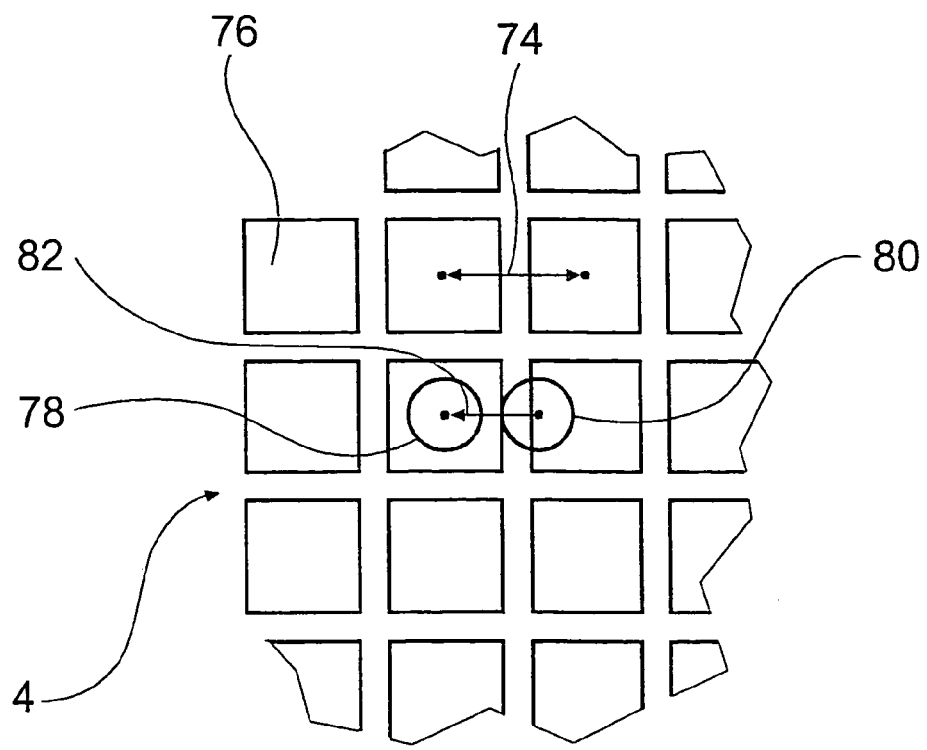
FIG. 5 shows a diagrammatically illustrated section of an image of an object scene on a detector unit.

In the event of a disturbance on the beam path through the optical arrangement 2, for example owing to vibration or shaking, the vibration or shaking is recorded by the acceleration sensor 58. The means 56 for determining a position of an image on the detector unit 4 is used to calculate a resulting beam path error therefrom. FIG. 5 shows a basic image 78 on a detector element 76, and an image 80 which is imaged on the detector unit 4 by a beam path error. A correction distance 82 or a correction value is calculated from the beam path error by the means 56, which delivers it to the control unit 24. The latter drives the movement actuators 46, 48, 50 in such a way that the prisms 42, 44 are tilted in relation to one another. The beam path is thereby corrected, and so the image 80 comes to lie on the basic image 78. It is possible in this way to achieve a line-of-sight stabilization of the image 80 on the detector unit 4.

An alternative line-of-sight stabilization can be achieved by firstly recording a basic image 78 and recording an image 80 in a following image. By using an image processing algorithm which is carried out by the means 56, it is possible to determine a displacement of the image 80 relative to the basic image 78, and to determine a correction value or a correction distance 82 for this. A subsequent image is imaged by tilting the prisms 42, 44 by the correction distance 82—or by another distance, which is interpolated, for example—in a fashion offset on the detector unit 4. The control unit 24 and the means 56 can thereby form a control loop for line-of-sight stabilization.

Figure 6:
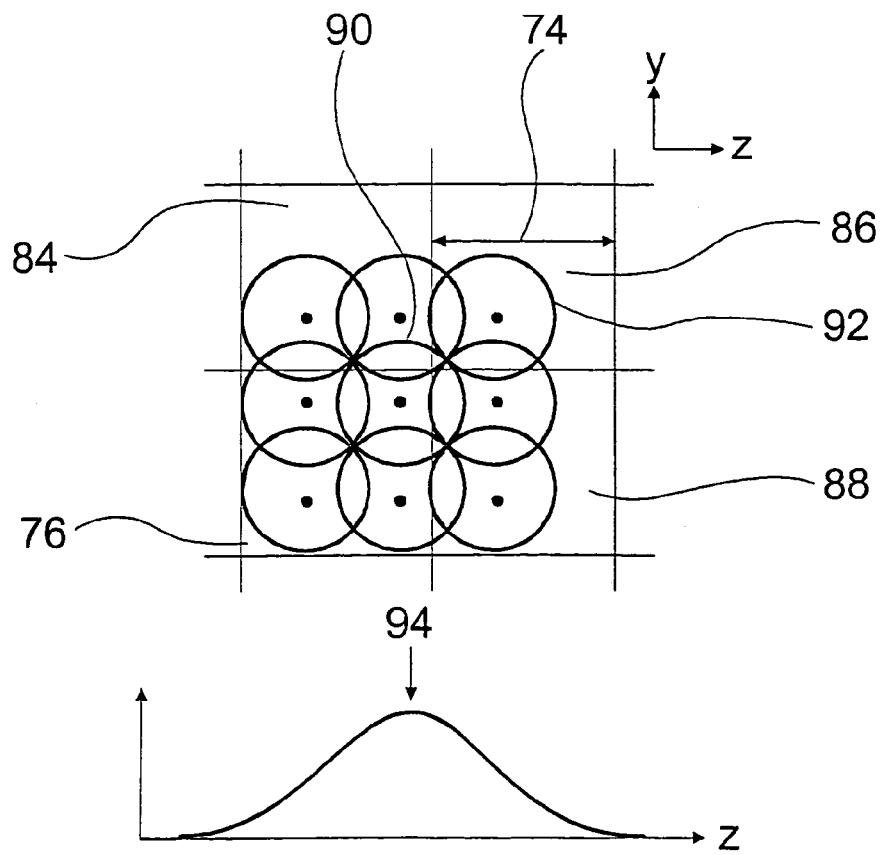
FIG. 6 shows a detail of an object scene recorded offset in a number of images.

FIG. 6 shows a diagram of detector elements 76, 84, 86, 88 on which a basic image 90 of an object of the object scene is imaged. At a first instant, the basic image 90 comes to lie for the most part on the detector element 76. The object is now imaged in, for example, eight consecutive recordings on the detector elements 76, 84, 86, 88, the beam path through the optical arrangement 2 being changed by tilting the prisms 42, 44 relative to one another. The object or an associated section of the object scene is imaged on the detector elements 76, 84, 86, 88 in a fashion displaced relative to the basic image 90 by half a pixel spacing 74 in each case. The basic image 9 and the additional eight images 92 are summed up and a centroid 94 is formed by the means 56. This centroid 94 is shown in the lower part of FIG. 6 as a prominent structure of intensity I plotted in the z-direction. The intensity I can relate in this case to the intensity of the radiation 32, the colour of the radiation, its polarization or another property of the radiation 32. The position of the centroid 94 can be used to achieve a spatial resolution of the imaged object or of the imaged section of the object scene which is finer than one pixel spacing 74.

REFERENCE SYMBOLS

2 Optical arrangement
4 Detector unit
6 Prism pair
8 Prism pair
10 Optical unit
12 Intermediate image plane
14 Optical unit
16 Homing head
18 Beam deflecting unit
20 Lens field
22 Lens field
24 Control unit
26 Movement unit
28 Optical axis
30 Arrow
32 Radiation
34 Prism attachment
36 Field of view
38 Prism pair
40 Prism pair
42 Prism
44 Prism
46 Movement actuator
48 Movement actuator
50 Movement actuator
52 Retaining means
54 Retaining means
56 Means
58 Acceleration sensor
60 Arrow
62 Spacing
64 Surface
66 Surface
68 Radiation
70 Tilt axis
72 Tilt axis
74 Pixel spacing
76 Detector element
78 Basic image
80 Image
82 Correction distance 84 Detector element
86 Detector element
88 Detector element
90 Basic image
92 Image
94 Centroid
I intensity

The invention claimed is:

1. Optical arrangement (2) for a homing head (16), for imaging an object scene onto a detector unit (4), comprising a control unit (24), a first optical unit (10) having two at least partially transparent optical elements (42, 44), a second optical unit (14) and a beam deflecting unit (18), the first optical unit (10) directing radiation from at least two sections of the object scene onto the beam deflecting unit (18) in superposition, and the beam deflecting unit (18) selecting one of the sections and, in conjunction with the second optical unit (14), imaging the selected section on the detector unit (4), characterized by a micromechanical movement actuator (46, 48, 50), the optical elements being mounted movably relative to one another, and the control unit (24) driving the movement actuator (46, 48, 50) and additionally setting a spacing (62) between the optical elements.

2. Optical arrangement (2) according to claim 1, characterized by at least three movement actuators (46, 48, 50) which are driven independently of each other, the control unit (24) controlling tilting of the optical elements relative to each other.

3. Optical arrangement (2) according to claim 1, characterized by a detector unit (4) and means (56) for determining a position of the image on the detector unit (4), the control unit (24) controlling tilting of the optical elements as a function of stipulations received from said means (56).

4. Optical arrangement (2) according to claim 3, characterized in that the control unit (24) and the means (56) determine a position of the image form a control loop.

5. Optical arrangement (2) according to claim 1, characterized in that the optical elements are supported against each other via the movement actuator (46, 48, 50).

6. Optical arrangement (2) according to claim 1, characterized by at least two said movement actuators (46, 48, 50) which are driven independently of each other.

7. Optical arrangement (2) according to claim 1, characterized in that the control unit (24) sets spacing (62) as a function of a prescribed spectral region which as subject to an at least 80 per cent extinction resulting from a multiple interference between the optical elements.

8. Optical arrangement (2) according to claim 1, characterized in that the two optical elements each respectively have a flat surface (64, 66) and the two surfaces (64, 66) are alignable parallel to each other and at a settable spacing (62) from each other.

9. Optical arrangement (2) according to claim 1, characterized in that the control unit (24) controls a sequence of tilt positions of the optical elements relative to each other such that the object scene is imaged on the detector unit (4) in multiple sequence, and in each instance offset from a basic image (90) by less than one pixel spacing (74) between two adjacent detector elements (76, 84, 86, 88) of the detector unit (4).

10. Optical arrangement (2) according to claim 1, characterized by at least two pairs of said optical elements each having at least one movement actuator (46, 48, 50), a first pair of said optical elements being provided for imaging a first section of the object scene, and a second pair of said optical elements being provided for imaging a second section which is different from the first, section of the object scene on the detector unit (4).

11. Missile homing head having an optical arrangement (2) according to claim 1.

12. Optical Arrangement (2) according to claim 1, characterized in that said optical elements (42, 44) comprise prisms.

* * * * *